US012774036B2

(12) United States Patent
Ritz et al.

(10) Patent No.: US 12,774,036 B2
(45) Date of Patent: Oct. 27, 2026

(54) MOTOR VEHICLE REAR AND METHOD FOR ASSEMBLING A MOTOR VEHICLE REAR

(71) Applicant: Dr. Ing. h.c. F. Porsche Aktiengesellschaft, Stuttgart (DE)

(72) Inventors: Thomas Ritz, Nufringen (DE); Dominik Beierl, Korntal-Münchingen (DE)

(73) Assignee: Dr. Ing. h.c. F. Porsche Aktiengesellschaft, Stuttgart (DE)

(*) Notice: Subject to any disclaimer, the term of this patent is extended or adjusted under 35 U.S.C. 154(b) by 368 days.

(21) Appl. No.: 18/388,666

(22) Filed: Nov. 10, 2023

(65) Prior Publication Data

US 2024/0158017 A1 May 16, 2024

(30) Foreign Application Priority Data

Nov. 14, 2022 (DE) ..................... 10 2022 130 032.3
Jul. 7, 2023 (DE) ..................... 10 2023 117 982.9

(51) Int. Cl.
*B62D 25/08* (2006.01)
*B62D 24/00* (2006.01)
(Continued)

(52) U.S. Cl.
CPC ............. *B62D 25/08* (2013.01); *B62D 24/00* (2013.01); *B62D 35/007* (2013.01); *B62D 65/04* (2013.01)

(58) Field of Classification Search
None
See application file for complete search history.

(56) References Cited

U.S. PATENT DOCUMENTS 2,733,096 A * 1/1956 Waterhouse ........... B62D 23/00 296/202
4,234,225 A * 11/1980 Harasaki .............. B62D 25/087 296/198

(Continued)

FOREIGN PATENT DOCUMENTS

CN 108382463 A 8/2018
DE 202017106446 U1 11/2017

(Continued)

OTHER PUBLICATIONS

German Examination Report for German Application No. 10 2023 117 982.9, dated Mar. 28, 2024 with English translation. (12 pages).

(Continued)

*Primary Examiner* — Joseph D. Pape
(74) *Attorney, Agent, or Firm* — Buchanan Ingersoll & Rooney PC

(57) ABSTRACT

A motor vehicle rear, with a rear cover defining in sections an outer skin of the motor vehicle rear. A first rear side part defines in sections the outer skin of the motor vehicle rear laterally beside the rear cover on a first side thereof. A second rear side part defines in sections the outer skin of the motor vehicle rear laterally beside the rear cover on a second side thereof. A rear center part defines the outer skin of the motor vehicle rear below the rear cover, wherein the first rear side part, the second rear side part, and the rear center part are formed as separate assemblies and are separately fastened on a frame structure or sheet-metal structure of a shell of the motor vehicle rear.

19 Claims, 2 Drawing Sheets

(51) Int. Cl.

| | |
|---|---|
| ***B62D 35/00*** | (2006.01) |
| ***B62D 65/04*** | (2006.01) |

(56) References Cited

U.S. PATENT DOCUMENTS

| | | | | | |
|---|---|---|---|---|---|
| 4,332,012 | A * | 5/1982 | Sekine | B62D 65/18 209/552 |
| 4,874,200 | A * | 10/1989 | Nasu | B62D 23/00 296/193.04 |
| 6,102,470 | A * | 8/2000 | Heim | B62D 25/087 293/133 |
| 6,237,211 | B1 | 5/2001 | Clare et al. | |
| 10,259,509 | B2 | 4/2019 | Marchlewski et al. | |
| 10,495,282 | B2 * | 12/2019 | Ramos, II | F21S 43/19 |
| 2004/0066061 | A1 | 4/2004 | Engels et al. | |
| 2010/0026238 | A1 * | 2/2010 | Suzuki | B60Q 3/30 320/109 |
| 2017/0305472 | A1 | 10/2017 | Lee et al. | |

FOREIGN PATENT DOCUMENTS

| | | | | |
|---|---|---|---|---|
| DE | 102021104079 A1 | * | 8/2022 | B60L 50/64 |
| EP | 1127777 A1 | * | 8/2001 | B62D 29/001 |
| JP | H 10152071 | * | 6/1998 | |

OTHER PUBLICATIONS

Great Britain Combined Search and Examination Report for Application No. GB2317120.0, dated May 1, 2024. (2 pages).

Office Action (Korean Request for the Submission of an Opinion) issued May 28, 2025, by the Intellectual Property Office in corresponding Korean Patent Application No. 10-2023-0154157 and an English translation of the Office Action. (7 pages).

"Why Do EV Charging Ports Vary in Location", (Mar. 6, 2021), 18 pages, Retrieved from the Internet: https://blog.naver.com/lagrange0115/223734331283, with English translation.

* cited by examiner

MOTOR VEHICLE REAR AND METHOD FOR ASSEMBLING A MOTOR VEHICLE REAR

CROSS-REFERENCE TO RELATED APPLICATION

This application claims priority to German Patent Application No. 10 2022 130 032.3, filed Nov. 14, 2022, and German Patent Application No. 10 2023 117 982.9, filed Jul. 7, 2023, the content of such application being incorporated by reference herein in its entirety.

FIELD OF THE INVENTION

The invention relates to a motor vehicle rear. The invention further relates to a method for assembling a motor vehicle rear.

SUMMARY OF THE INVENTION

A shell structure of a motor vehicle has at least a frame structure or a sheet-metal structure as well as exterior components mounted on the frame structure or sheet-metal structure. The exterior components are also referred to as trim parts and in each case bound in sections an outer skin of the motor vehicle. The frame structure or sheet-metal structure is also referred to as Body-In-White.

In the case of motor vehicle rears of motor vehicles, namely passenger cars, known from practice, a trim part is arranged laterally beside and below a rear cover of the motor vehicle rear, which trim part defines in sections an outer skin of the motor vehicle rear and extends across the entire width of the motor vehicle rear when viewed in the transverse direction. Such a rear part has a large weight and can be fastened on a frame structure or a sheet-metal structure of a shell structure only in a cumbersome manner, in particular when further assemblies are pre-mounted on the rear trim part. There is a need for a motor vehicle rear that can be mounted with less effort. There is also a need for a method for assembling the motor vehicle rear.

According to aspects of the invention, the motor vehicle rear comprises at least the following assemblies: A rear cover defining in sections an outer skin of the motor vehicle rear. A first rear side part defining in sections the outer skin of the motor vehicle rear laterally beside the rear cover on a first side thereof. A second rear side part defining in sections the outer skin of the motor vehicle rear laterally beside the rear cover on a second side thereof. A rear center part defining the outer skin of the motor vehicle rear below the rear cover.

According to aspects of the invention, the first rear side part, the second rear side part, and the rear center part are formed as separate assemblies and are separately fastened on a frame structure or sheet-metal structure of a shell of the motor vehicle rear.

In the motor vehicle rear according to aspects of the invention, a rear trim, which is positioned laterally below as well as beside the rear cover of the motor vehicle rear, comprises at least three separate and thus disconnected assemblies, namely the two rear side parts as well as the rear center part, which are separately and thus independently fastened on the frame structure or sheet-metal structure of the shell of the motor vehicle rear.

Accordingly, it is proposed that a rear trim part, which is made in one piece according to practice and extends over the entire width of the motor vehicle rear, be divided into at least three separate assemblies and fastened separately to the frame structure or sheet-metal structure of the shell.

This clearly simplifies the assembly of the motor vehicle rear. Fastening and/or support points for the assembly are more easily accessible. The individual assemblies have a lower weight.

Preferably, the first rear side part and/or the second rear side part in each case receives a respective charging flap module and/or an air-guiding module and in each case is fastened together as a pre-mounted unit with the charging flap module and/or the air-guiding module on the frame structure or sheet-metal structure of the shell of the motor vehicle rear. Then, when the first rear side part and/or the second rear side part receive a charging flap module and/or an air-guiding module, the invention has a particular advantage. A charging flap module and/or air-guiding module increases the weight, whereby the separation of the rear trim part, which according to practice would be transversely continuous, into the at least three assemblies, is particularly advantageous. Furthermore, when a charging flap module is mounted on the rear side part, the charging flap module can then be simply removed from [sic: stuck onto] a charging socket mounted on the frame structure or sheet-metal structure of the shell, namely in an assembly direction for the respective rear side part extending in the transverse direction of the motor vehicle rear. This also serves to simplify the assembly of the motor vehicle rear.

Preferably, the motor vehicle rear comprises a rear panel formed as a separate assembly defining in sections the outer skin of the motor vehicle rear and arranged between the rear cover and the rear center part and fastened separately to the frame structure or sheet-metal structure of the shell of the motor vehicle rear. Depending on the desired design of the motor vehicle rear, a panel can be arranged below the rear cover and above the rear center part, which panel is in turn formed as a separate assembly and is mounted separately on the frame structure or sheet-metal structure of the shell. This also serves to simplify the assembly of the motor vehicle rear.

The method according to aspects of the invention for assembling the motor vehicle rear according to aspects of the invention comprises at least the following steps:

- providing the frame structure or sheet-metal structure of the shell, the first rear side part, the second rear side part, and the rear center part.

The rear flap is preferably pre-mounted on the frame structure or sheet-metal structure of the shell provided.

- connecting the first rear side part to the frame structure or sheet-metal structure of the shell on a first side thereof in a first assembly direction extending in the transverse direction of the motor vehicle rear.
- connecting the second rear side part to the frame structure or sheet-metal structure of the shell on a second side thereof in a second assembly direction extending in the transverse direction of the motor vehicle rear that runs counter to the first assembly direction.
- after connecting the first and second rear side parts to the frame structure or sheet-metal structure of the shell, connecting the rear center part to the frame structure or sheet-metal structure of the shell in a third assembly direction extending in the longitudinal direction of the motor vehicle rear.

This method allows for a particularly simple assembly of the motor vehicle rear according to aspects of the invention.

BRIEF DESCRIPTION OF THE DRAWINGS

Preferred further developments of the invention follow from the subclaims and the following description. Without being restricted thereto, embodiment examples of the invention are explained in greater detail with reference to the drawings. Shown are:

DETAILED DESCRIPTION OF THE INVENTION

Figure 1:
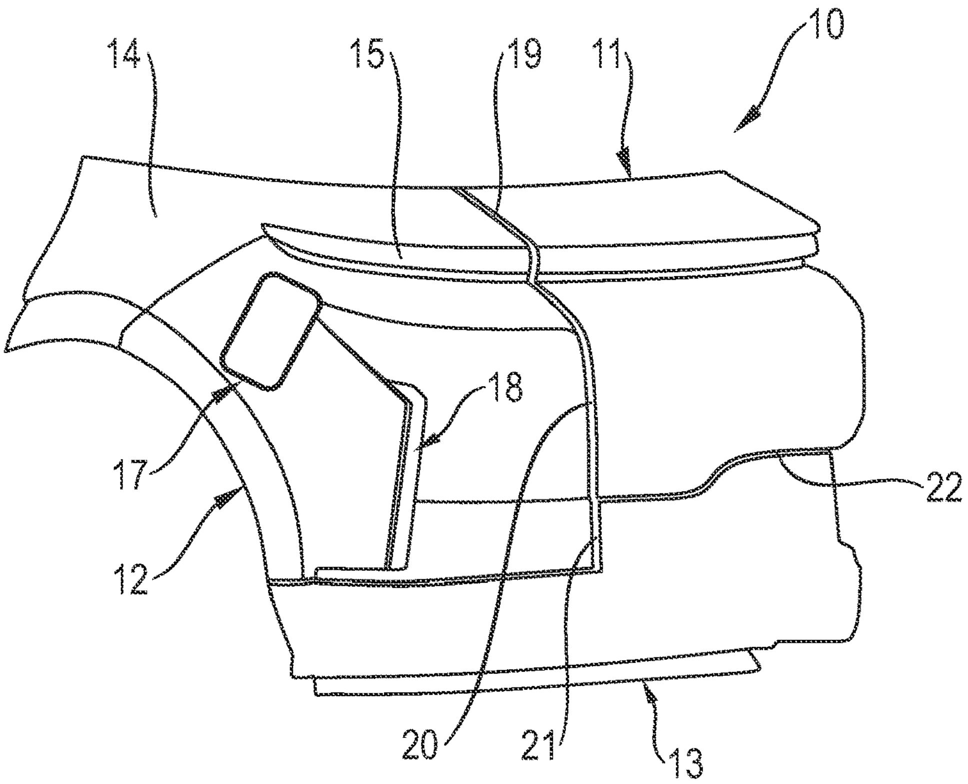
FIG. 1 a perspective view of a section of a motor vehicle rear according aspects of the invention from an oblique outside direction onto the motor vehicle rear in the region of a rear cover, a rear side part, a rear center part, and a side wall, FIG. 2 a view from inside of the rear side part of FIG. 1, FIG. 3 steps of the method according to aspects of the invention for assembling the motor vehicle rear according to aspects of the invention.

FIG. 1 shows a section of a motor vehicle rear 10 according to aspects of the invention in an oblique rear view of the motor vehicle rear 10. Thus, in FIG. 1, a rear cover 11 is shown, which can be opened and closed and defines in sections an outer skin of the motor vehicle rear 10.

The motor vehicle rear 10 according to aspects of the invention further has rear side parts 12 beside the rear cover 11. In FIG. 1, only a rear side part 12 is shown, which is arranged on a first side of the rear cover 11 laterally beside the same and defines in sections the outer skin of the motor vehicle rear 10.

Also on the opposite side of the rear cover 11, which is not shown in FIG. 1, such a rear side part 12 is arranged, which defines in sections the outer skin of the motor vehicle rear 10 on the opposite side.

FIG. 1 further shows a rear center part 13. The rear center part 13 extends below the rear cover 11 as well as below the rear side parts 12, wherein the rear center part 13 also defines the outer skin of the motor vehicle rear 10 in sections.

FIG. 1 further shows a rear side part 12, shown at the top in FIG. 1, and a side wall 14 of the motor vehicle positioned laterally beside the rear cover 11, which also defines in sections an outer skin thereof in the region of the motor vehicle rear 10.

Portions of a rear light 15 of the motor vehicle are integrated into the rear cover 11 and the side walls 14.

The rear side parts 12 and the rear center part 13 arranged on opposite sides of the rear cover 11 are formed as separate assemblies and are separately fastened on a frame structure or sheet-metal structure 16 of a shell.

Preferably, the motor vehicle rear 10 is a motor vehicle rear of an electric vehicle. In this case, at least one rear side part 12, preferably both rear side parts 12, comprises a charging flap module 17. A charging socket of the electric vehicle can then be accessed via the respective charging flap module 17 when it is opened.

Figure 2:
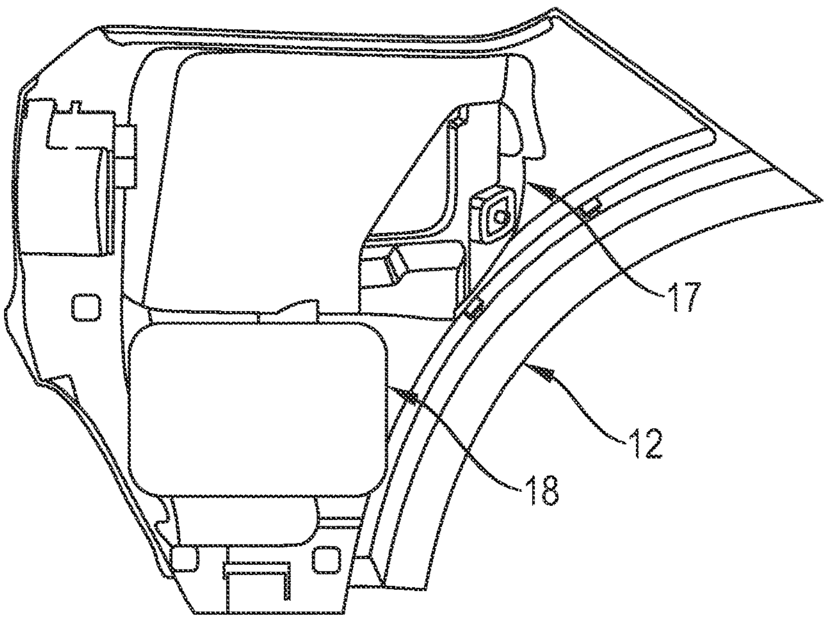

In the embodiment example shown, each rear side part 12 further receives an air-guiding module 18. The air-guiding module 18 has an air-guiding element, which can be automatically adjusted depending on the vehicle speed of the motor vehicle. FIG. 1 shows the charging flap module 17 as well as the air-guiding module 18 from the outside. FIG. 2 shows the charging flap module 17 as well as the air-guiding module 18 mounted from the inside on the rear side part 12.

Due to the fact that the two rear side parts 12 and the rear center part 13 are configured as separate assemblies, a seam 19 is formed not only between the rear cover 11 and the respective side wall 14, but rather a seam 20 is also formed between the rear cover 11 and the respective rear side part 12 and a seam 21 is formed between the respective rear side part 12 and the rear center part 13.

In FIG. 1, the rear center part 13 extends below the rear side parts 12 as well as below the rear cover 11, namely such that the rear center part 13 extends in the region of the rear cover 11 while forming a seam 22 with the rear cover 11.

In contrast to this, it is also possible for a rear panel not shown in the figures to be arranged between the rear cover 11 and the rear center part 13, which is in turn formed as a separate assembly and is mounted or fastened separately on the frame structure or sheet-metal structure 16 of the shell.

The invention further relates to a method for manufacturing the motor vehicle rear according to aspects of the invention 10. The method according to aspects of the invention comprises at least the following steps:

providing the frame structure or sheet-metal structure 16 of the shell, the rear side parts 12, as well as the rear center part 13, The rear flap 11 and/or the side walls 14 can be pre-mounted on the frame structure or sheet-metal structure 16 of the shell provided, connecting the first rear side part 12 to the frame structure or sheet-metal structure 16 of the shell 16 on a first side of the shell 16 in a first assembly direction extending in the transverse direction of the motor vehicle rear, connecting the second rear side part 12 to the frame structure or sheet-metal structure 16 of the shell 16 on an opposing second side of the frame structure or sheet-metal structure 16 of the shell 16 in a second assembly direction extending in the transverse direction of the motor vehicle rear 10 that runs counter to the first assembly direction, after connecting the first and second rear side parts 12 to the frame structure or sheet-metal structure 16 of the shell, connecting the rear center part 13 to the frame structure or sheet-metal structure 16 of the shell in a third assembly direction extending in the longitudinal direction of the motor vehicle rear 10, which accordingly extends perpendicular or approximately perpendicular to the first and second assembly direction.

Then, when the respective rear side part 12 comprises a charging flap module 17 and/or an air-guiding module 18, these modules 17, 18 are also provided and pre-mounted on the respective rear side part 12, wherein this pre-mounted unit is then fastened on the frame structure or sheet-metal structure 16 of the shell in the respective assembly direction, i.e. the first rear side part 12 with the pre-mounted charging flap module 17 and/or the pre-mounted air-guiding module 18 is fastened in the first assembly direction and the second rear side part 12 with the charging flap module 17 and/or the air-guiding module 18 pre-mounted thereon is fastened in the second assembly direction on the frame structure or sheet-metal structure 16 of the shell.

Further details of the method according to aspects of the invention for assembling the motor vehicle rear 10 according to aspects of the invention are described below with reference to FIG. 3.

Figure 3:
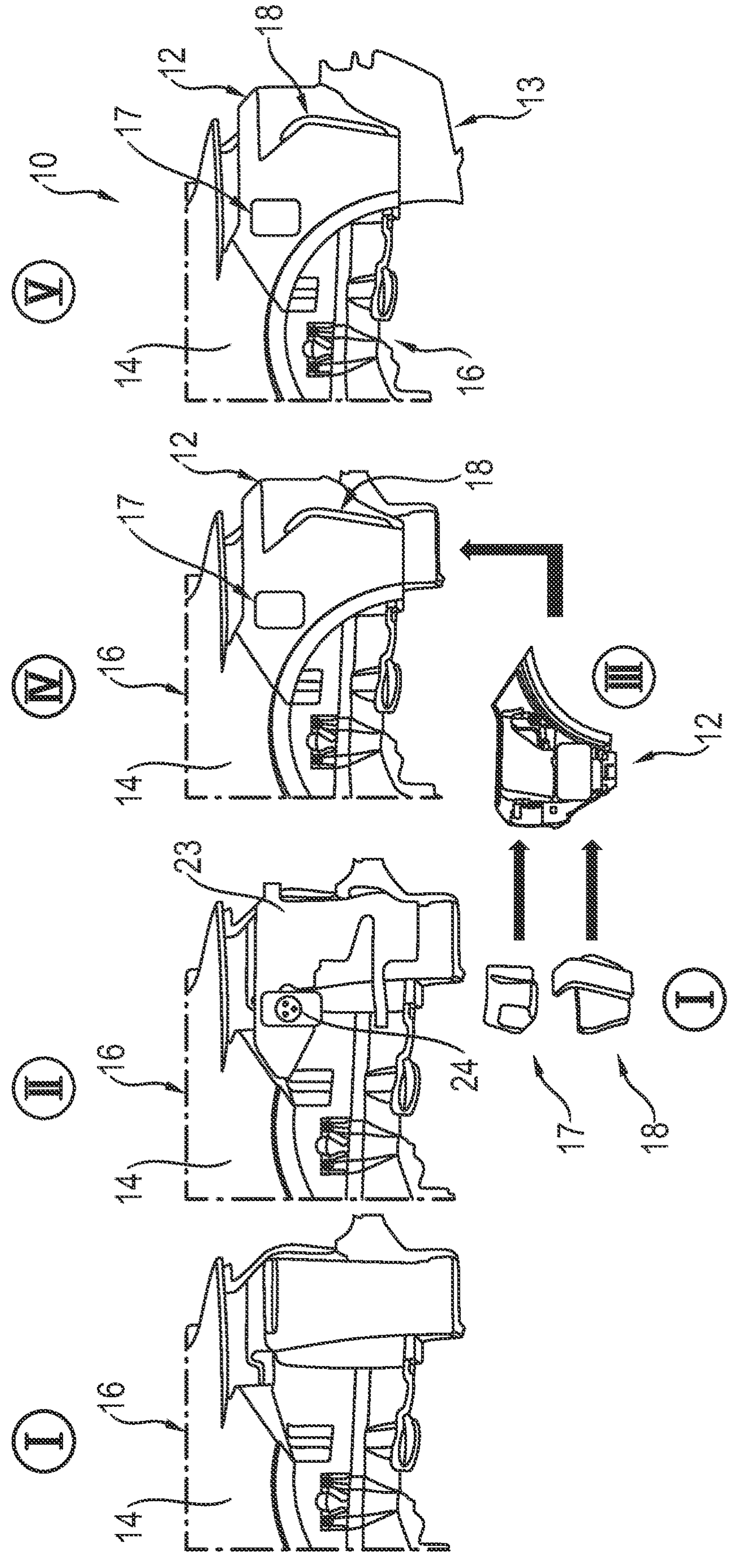

In step I, the individual assemblies, which are needed to form the motor vehicle rear 10 according to aspects of the invention, are provided, wherein FIG. 3 shows the frame structure or sheet-metal structure 16 of the shell provided, a rear side part 12 provided, as well as a charging flap module 17 provided and an air-guiding module 18 provided. The side panels 14 and the rear cover 11 not shown in FIG. 3 are pre-mounted on the frame structure or sheet-metal structure 16 provided.

In step II, a respective holder 23 for each rear side part 12 to be mounted is fastened on the frame structure or sheet-metal structure 16 of the shell. Likewise, a charging bushing 24 is mounted on the shell 16.

In step III, the charging flap module 17 as well as the air-guiding module 18 are pre-mounted on the respective rear side part 12.

In FIG. 3, for step III, a pre-mounted unit is shown, consisting of the rear side part 12 and the charging flap module 17 mounted on the rear side part 12 and the air-guiding module 18 also mounted thereon.

In step IV, two pre-mounted units are subsequently mounted on the frame structure or sheet-metal structure 16 of the shell on opposite sides thereof, namely on the respective holder 23 for the respective rear side part 12.

The assembly of the pre-mounted units on the frame structure or sheet-metal structure 16 of the shell 16 takes place in the transverse direction of the frame structure or sheet-metal structure 16 of the shell or the motor vehicle rear 10. In doing so, the charging bushing 24 can be simply threaded into the charging flap module 17 of the respective rear side part 12 in the transverse direction.

After both rear side parts 12 in each case have been fastened on the respective holder 23 and thus on the frame structure or sheet-metal structure 16 of the shell 16 in the transverse direction of the motor vehicle rear 10 in step IV, namely in the first and second assembly directions, in step V the rear center part 13 is subsequently connected to the frame structure or sheet-metal structure 16 of the shell, namely in the third assembly direction extending in the longitudinal direction of the motor vehicle rear.

Accordingly, in the particularly preferred embodiment example of a motor vehicle rear 10 of an electric vehicle shown in FIGS. 1 to 3, the two rear side parts 12 in each case comprise a charging flap module 17 and an air-guiding module 18.

These modules 17, 18 are pre-mounted on the respective rear side part 12, wherein these pre-mounted units consisting of the respective rear side part 12, the respective charging flap module 17, and the respective air-guiding module 18 are mounted on the frame structure or sheet-metal structure 16 of the shell, namely on the respective holder 23, in a first or second assembly direction extending in the transverse direction.

The assembly of the rear side parts 12 or the pre-mounted units consisting of the rear side parts 12 and the charging flap module 17, as well as the air-guiding module 18, can be carried out simply on the frame structure or sheet-metal structure 16 of the shell; in particular, the threading of the respective charging bushing 24 into the respective charging flap module 17 in the transverse direction is possible in a simple manner.

The respective air-guiding module 18 is mounted not only on the respective rear side part 12, but preferably also on the frame structure or sheet-metal structure 16 of the shell. After mounting the respective rear side part 12 on the frame structure or sheet-metal structure 16 of the shell, attachment points for the respective air-guiding module 18 to the frame structure or sheet-metal structure 16 of the shell 16 are easily accessible. Only then is the separate rear center part 13 mounted on the frame structure or sheet-metal structure 16 of the shell.

What is claimed is:

1. A motor vehicle rear comprising:

a rear cover defining, in sections, an outer skin of the motor vehicle rear, a first rear side part defining, in sections, the outer skin of the motor vehicle rear at a location that is laterally beside the rear cover on a first side of the rear cover, a second rear side part defining, in sections, the outer skin of the motor vehicle rear at a location that is laterally beside the rear cover on a second side of the rear cover that is opposite the first side, a rear center part defining the outer skin of the motor vehicle rear, the rear center part being positioned at an elevation beneath the rear cover, wherein the first rear side part, the second rear side part, and the rear center part are formed as separate parts or assemblies and are separately fastened on a frame structure or sheet-metal structure of a shell of the motor vehicle rear, and wherein the first rear side part and/or the second rear side part, in each case, receives a respective charging flap module and/or an air-guiding module and is fastened as a pre-mounted unit to the frame structure or sheet-metal structure of the shell of the motor vehicle rear.

2. The motor vehicle rear according to claim 1, wherein the rear center part extends to an elevation beneath the rear cover and beneath the first and second rear side parts.

3. The motor vehicle rear according to claim 1, wherein a rear panel formed as a separate assembly defining, in sections, the outer skin of the motor vehicle rear, is arranged between the rear cover and the rear center part and is fastened separately to the frame structure or sheet-metal structure of the shell of the motor vehicle rear.

4. A motor vehicle comprising the motor vehicle rear according to claim 1.

5. A method for assembling a motor vehicle rear, said method comprising:

(a) connecting a first rear side part, which constitutes an outer skin of the motor vehicle rear, to a frame structure or sheet-metal structure of a shell of the motor vehicle rear on a first side of the shell and in a first assembly direction extending in a transverse direction of the motor vehicle rear, (b) connecting a second rear side part, which also constitutes the outer skin of the motor vehicle rear, to the frame structure or sheet-metal structure of the shell on a second side of the shell and in a second assembly direction extending in the transverse direction of the motor vehicle rear that runs counter to the first assembly direction, and (c) following steps (a) and (b), connecting a rear center part, which also constitutes the outer skin of the motor vehicle rear, to the frame structure or sheet-metal structure of the shell in a third assembly direction extending in a longitudinal direction of the motor vehicle rear, wherein the first rear side part, the second rear side part, and the rear center part are formed as separate parts.

6. The method according to claim 5, wherein, prior to step (a), the method further comprises mounting a charging flap module and/or an air-guiding module on the first rear side part to form a pre-mounted unit, and fastening the pre-mounted unit on the frame structure or sheet-metal structure of the shell in the first assembly direction.

7. The method according to claim 5, wherein, prior to step (b), the method further comprises mounting a charging flap module and/or an air-guiding module on the second rear side part to form a pre-mounted unit, and fastening the pre-mounted unit on the frame structure or sheet-metal structure of the shell in the second assembly direction.

8. The method according to claim 5, further comprising arranging a rear panel between (i) a rear cover, which also constitutes the outer skin of the motor vehicle rear, extending between the first and second rear side parts and (ii) the rear center part, and fastening the rear panel on the frame structure or sheet-metal structure of the shell of the motor vehicle rear in the third assembly direction.

9. The motor vehicle rear according to claim 1, wherein the rear center part constitutes a rear bumper of the motor vehicle rear.

10. The motor vehicle rear according to claim 9, wherein a rear light is integrated into the rear cover.

11. The motor vehicle rear according to claim 9, wherein each rear side part is fixed to the frame structure or sheet-metal structure of the shell of the motor vehicle rear at a location beside a side wall of a motor vehicle.

12. The motor vehicle rear according to claim 1, wherein the first rear side part and/or the second rear side part, in each case, receives the respective charging flap module and the air-guiding module and is fastened as the pre-mounted unit to the frame structure or sheet-metal structure of the shell of the motor vehicle rear.

13. The motor vehicle rear according to claim 1, wherein the charging flap module is mounted to the first rear side part, wherein the charging flap module along with the first rear side part is fastened as the pre-mounted unit to the frame structure of the motor vehicle rear.

14. The motor vehicle rear according to claim 1, wherein the outer skin of the motor vehicle rear constitutes an outer most visible surface of the motor vehicle rear in a final assembly state of the motor vehicle rear.

15. The method according to claim 5, wherein the rear center part constitutes a rear bumper of the motor vehicle rear.

16. The method according to claim 5, wherein, prior to step (a), the method further comprises mounting a charging flap module and an air-guiding module on the first rear side part to form a pre-mounted unit, and fastening the pre-mounted unit on the frame structure or sheet-metal structure of the shell in the first assembly direction.

17. The method according to claim 5, wherein, prior to step (a), the method further comprises mounting a charging flap module on the first rear side part to form a pre-mounted unit, and fastening the pre-mounted unit on the frame structure or sheet-metal structure of the shell in the first assembly direction.

18. The method according to claim 5, wherein the outer skin of the motor vehicle rear constitutes an outer most visible surface of the motor vehicle rear in a final assembly state of the motor vehicle rear.

19. The method according to claim 5, further comprising arranging a rear cover at a location that is between the first and second rear side parts and above the rear center part, wherein the rear center part constitutes a rear bumper of the motor vehicle rear, and a rear light is integrated into the rear cover.

* * * * *